US008612649B2

(12) United States Patent
Cormode et al.

(10) Patent No.: US 8,612,649 B2
(45) Date of Patent: Dec. 17, 2013

(54) VALIDATION OF PRIORITY QUEUE PROCESSING

(75) Inventors: Graham Cormode, Morristown, NJ (US); Amit Chakrabarti, Hanover, NH (US); Ranganath Kondapally, Hanover, NH (US); Andrew Iain Shaw McGregor, Amherst, MA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 250 days.

(21) Appl. No.: 12/971,913

(22) Filed: Dec. 17, 2010

(65) Prior Publication Data

US 2012/0159500 A1 Jun. 21, 2012

(51) Int. Cl.
*G06F 13/12* (2006.01)

(52) U.S. Cl.
USPC .............................................. 710/52; 710/55

(58) Field of Classification Search
None
See application file for complete search history.

(56) References Cited

U.S. PATENT DOCUMENTS

| | | | |
|---|---|---|---|
| 4,423,480 A | 12/1983 | Bauer et al. | |
| 4,488,218 A | 12/1984 | Grimes | |
| 4,583,219 A | 4/1986 | Riddle | |
| 4,965,716 A | 10/1990 | Sweeney | |
| 5,521,916 A | 5/1996 | Choudhury et al. | |
| 5,630,123 A | 5/1997 | Hogge | |
| 5,634,006 A | 5/1997 | Baugher et al. | |
| 5,784,647 A | 7/1998 | Sugimoto | |
| 5,850,538 A | 12/1998 | Steinman | |
| 5,872,938 A | 2/1999 | Williams | |
| 5,963,978 A | 10/1999 | Feiste | |
| 6,003,101 A | 12/1999 | Williams | |
| 6,055,533 A | 4/2000 | Hogge | |
| 6,434,230 B1 | 8/2002 | Gabriel | |
| 6,510,531 B1 * | 1/2003 | Gibbons | 714/37 |
| 6,570,883 B1 | 5/2003 | Wong | |
| 6,633,835 B1 | 10/2003 | Moran et al. | |
| 6,728,792 B2 | 4/2004 | Wagner | |
| 6,771,653 B1 | 8/2004 | Le Pennec et al. | |
| 6,872,325 B2 | 3/2005 | Bandyopadhyay et al. | |
| 6,915,360 B2 | 7/2005 | Karlsson et al. | |
| 6,934,294 B2 | 8/2005 | Bertagna | |
| 6,981,260 B2 | 12/2005 | Brenner et al. | |
| 7,293,051 B1 | 11/2007 | Printezis et al. | |

(Continued)

OTHER PUBLICATIONS

Chakrabarti, A., Cormode, G., Kondapally, R., McGregor, A., Information Cost Tradeoffs for Augmented Index and Streaming Language Recognition, 51st Annual IEEE Symposium on Foundations of Computer Science (FOCS 2010), Oct. 23-26, 2010, Las Vegas, Nevada.

*Primary Examiner* — Chun-Kuan Lee
*Assistant Examiner* — David Martinez
(74) *Attorney, Agent, or Firm* — Scott P. Zimmerman, PLLC (57) ABSTRACT

A method for validating outsourced processing of a priority queue includes configuring a verifier for independent, single-pass processing of priority queue operations that include insertion operations and extraction operations and priorities associated with each operation. The verifier may be configured to validate N operations using a memory space having a size that is proportional to the square root of N using an algorithm to buffer the operations as a series of R epochs. Extractions associated with each individual epoch may be monitored using arrays Y and Z. Insertions for the epoch k may monitored using arrays X and Z. The processing of the priority queue operations may be verified based on the equality or inequality of the arrays X, Y, and Z. Hashed values for the arrays may be used to test their equality to conserve storage requirements.

18 Claims, 7 Drawing Sheets

(56) References Cited

U.S. PATENT DOCUMENTS

| | | |
|---|---|---|
| 7,310,670 B1 | 12/2007 | Walbeck et al. |
| 7,450,032 B1 | 11/2008 | Cormode et al. |
| 7,451,258 B1 | 11/2008 | Hiratzka et al. |
| 7,558,775 B1 | 7/2009 | Panigrahy et al. |
| 7,567,187 B2 | 7/2009 | Ramaiah et al. |
| 7,584,396 B1 | 9/2009 | Cormode et al. |
| 7,590,657 B1 | 9/2009 | Cormode et al. |
| 7,657,503 B1 | 2/2010 | Cormode et al. |
| 7,694,040 B2 | 4/2010 | Yeh |
| 7,710,871 B2 | 5/2010 | Lavian et al. |
| 7,734,658 B2 | 6/2010 | Parkinson et al. |
| 7,742,424 B2 | 6/2010 | Cormode et al. |
| 7,756,805 B2 | 7/2010 | Cormode et al. |
| 7,783,647 B2 | 8/2010 | Cormode et al. |
| 7,827,435 B2 | 11/2010 | Sahoo et al. |
| 2002/0021701 A1 | 2/2002 | Lavian et al. |
| 2002/0083063 A1 | 6/2002 | Egolf |
| 2002/0087757 A1 | 7/2002 | Wagner |
| 2003/0182464 A1 | 9/2003 | Hamilton et al. |
| 2003/0195920 A1 | 10/2003 | Brenner et al. |
| 2003/0208552 A1 | 11/2003 | Karlsson et al. |
| 2004/0045635 A1 | 3/2004 | Bandyopadhyay et al. |
| 2004/0076161 A1 | 4/2004 | Lavian et al. |
| 2004/0151197 A1 | 8/2004 | Hui |
| 2004/0158464 A1 | 8/2004 | Baker |
| 2004/0179535 A1 | 9/2004 | Bertagna |
| 2005/0131946 A1 | 6/2005 | Korn et al. |
| 2005/0132153 A1 | 6/2005 | Yeh |
| 2006/0184939 A1 | 8/2006 | Sahoo et al. |
| 2006/0224609 A1 | 10/2006 | Cormode et al. |
| 2007/0136285 A1 | 6/2007 | Cormode et al. |
| 2007/0219816 A1 | 9/2007 | Van Luchene et al. |
| 2007/0237410 A1 | 10/2007 | Cormode et al. |
| 2007/0240061 A1 | 10/2007 | Cormode et al. |
| 2007/0286071 A1 | 12/2007 | Cormode et al. |
| 2008/0042880 A1 | 2/2008 | Ramaiah et al. |
| 2008/0071811 A1 | 3/2008 | Parkinson et al. |
| 2008/0075003 A1 | 3/2008 | Lee et al. |
| 2008/0098145 A1 | 4/2008 | Yeh |
| 2008/0276241 A1 | 11/2008 | Bajpai et al. |
| 2009/0083418 A1 | 3/2009 | Krishnamurthy et al. |
| 2009/0132561 A1 | 5/2009 | Cormode et al. |
| 2009/0153379 A1 | 6/2009 | Cormode et al. |
| 2009/0172058 A1 | 7/2009 | Cormode et al. |
| 2009/0172059 A1 | 7/2009 | Cormode et al. |
| 2009/0292726 A1 | 11/2009 | Cormode et al. |
| 2010/0114989 A1 | 5/2010 | Cormode et al. |
| 2010/0132036 A1 | 5/2010 | Hadjieleftheriou et al. |
| 2010/0152129 A1 | 6/2010 | Giridharan et al. |
| 2010/0153064 A1 | 6/2010 | Cormode et al. |
| 2010/0153328 A1 | 6/2010 | Cormode et al. |
| 2010/0153379 A1 | 6/2010 | Cormode et al. |
| 2010/0235362 A1 | 9/2010 | Cormode et al. |
| 2010/0268719 A1 | 10/2010 | Cormode et al. |
| 2010/0312872 A1 | 12/2010 | Cormode et al. |

\* cited by examiner

VALIDATION OF PRIORITY QUEUE PROCESSING

FIELD OF THE DISCLOSURE

The present disclosure relates to validating data processing and, specifically, to validating priority queue processing.

BACKGROUND

Validation of data processing may involve processing operations on data streams, such as those associated with a priority queue. The data processing may be associated with an infrastructure for handling large-volume data streams. An owner of a data stream may choose to outsource the data processing to a data service provider. The data stream owner may desire validation that the outsourced data service provider has correctly performed processing operations on the data stream.

DESCRIPTION OF THE EMBODIMENT(S)

Disclosed are methods for validating outsourced processing of a priority queue. The methods may include configuring a verifier for independent, single-pass processing of priority queue operations that include insertion operations and extraction operations and priorities associated with each operation. The verifier may be configured to validate N operations using a memory space having a size that is proportional to the square root of N using an algorithm to buffer the operations as a series of R epochs. Extractions associated with each individual epoch may be monitored using arrays Y and Z. Insertions for the epoch k may monitored using arrays X and Z. The processing of the priority queue operations may be verified based on the equality or inequality of the arrays X, Y, and Z. Hashed values for the arrays may be used to test their equality to conserve storage requirements.

In one aspect, a disclosed method for validating a priority queue includes assigning a plurality of priority queue operations into a plurality of epochs. The priority queue operations include priority queue insertions and priority queue extractions. Each insertion and each extraction is associated with a corresponding priority. A set of variables is maintained to record information indicative of insertions and extractions assigned to the corresponding epochs. The set of variables may include two or more variables for each of the plurality of epochs. Correct operation of the priority queue may be validated based on the set of variables.

Assigning the plurality of priority queue operations to epochs may include buffering consecutive operations and canceling operation pairs, where an operation pair includes an insertion of a given priority and a subsequently occurring extraction, within the buffer, of the same given priority. Assigning priority queue operations to the plurality of epochs may include processing each of the plurality of epochs sequentially and maintaining an array indicative of a maximum priority of extractions assigned to the current epoch and to each of the previously processed epochs.

The plurality of priority queue operations may include N operations and, in some embodiments, assigning the plurality of priority queue operations to epochs results in the formation of R epochs where R is proportional to the square root of N. Hashing functions may be employed to produce hashing function representations of the set of variables. These representations of the set of variables may be stored or otherwise maintained to reduce storage requirements. In some embodiments, for example, the memory space required to process the plurality of priority queue operations is proportional or roughly proportional to the number of epochs. The hashing function may be a linear function with respect to an input on which it operates.

The set of variables include may include a set of three variable arrays including an array X, an array Y, and an array Z where each of the arrays is initialized to zero. The arrays may each include a set of rows including a row corresponding to each of the epochs and a set of columns including a column corresponding to each of the set of operation priorities.

Informally, X tracks the number of insertions of u assigned to epoch k before the first extraction of u that is assigned to epoch k. Y tracks the number of extractions of u assigned to epoch k minus the number of insertions of u assigned to epoch k from the first extraction of u assigned to epoch k onwards. A necessary condition is that these two counts should agree. However, this counting alone fails to detect extractions of u that appear before the corresponding insertions. Therefore, Z is used to identify the maximum "balance" of u during epoch k. This should also match X if the sequence is correct.

After each epoch is processed, f[k] may indicate a maximum value of a priority corresponding to an extraction that occurs after the k-th epoch. For each epoch k, the method may include processing each extraction in the epoch and then processing each insertion in the epoch. For each extraction in epoch k, the method may include assigning the extraction to an earliest epoch L consistent with its priority and the values of f[k], incrementing an element [L, u] of array Y, assigning a value max(Y[L, u], Z[L, u]) to an element [L, u] of array Z, and assigning a value max(u, f[i]) to f[i] for each i in the range of {1 . . . (k−1)}. For each insertion in epoch k, the method may include assigning the insertion to an earliest epoch L consistent with its priority and the values of f[k], incrementing an element [L, u] of array X when f[L]<u, and decrementing an element [L, u] of array Y when f[L]=u. Priority queue validation may then be performed based on simple manipulations of arrays X, Y, and Z.

The first epoch may exclude extractions and the final epoch may exclude insertions. In some implementations, each of the R epochs may be equally-sized with respect to a number of operations. In other cases, each of the R epochs may be equally-sized with respect to a period of time.

In some embodiments, validating that the priority queue operations were correctly processed occurs when X=array Z and array X=array Y. Representations of the arrays X, Y, and Z may be stored using an array hashing function to conserve storage requirements. The array hashing function may be a linear function with respect to an input array. In some cases, a memory space required for processing N priority queue operations may be proportional to the square root of N.

In another aspect, a disclosed computer system for validating priority queue operations includes a processor configured to access memory media that include processor executable instructions. The instructions include instructions to perform the method operations described above.

In some embodiments, disclosed methods include, for each epoch k, determining a set of operations I that are inserted but not extracted during epoch k, determining a set of operations E that are extracted without a matching insertion operation during epoch k, and cancelling out all remaining operations in epoch k except for the set I and the set E.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
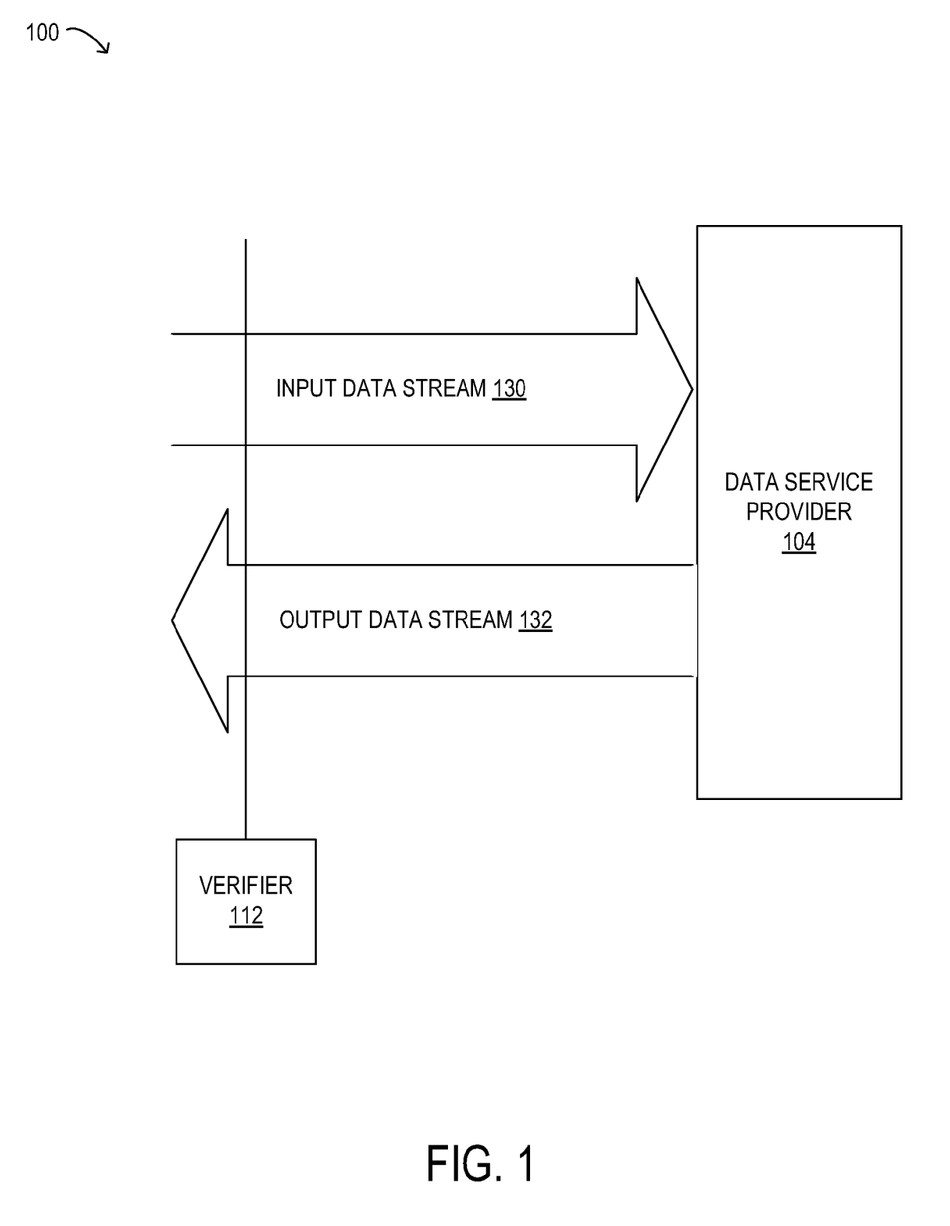
FIG. 1 is a block diagram of selected elements of a streaming data processing system.

Turning now to the drawings, FIG. 1 is a block diagram of selected elements of streaming data processing system 100. The elements of streaming data processing system 100 of FIG. 1 may be located at various remote locations. For example, data service provider 104 and verifier 112 may each represent functionality at one or more individual locations that are accessible via suitable network connections. The data streams associated with streaming data processing system 100, as shown, include input data stream 130 arriving at data service provider 104 via verifier 112, and output data stream 132 originating from data service provider 104 and passing through verifier 112. Input data stream 130 and/or output data stream 132 may represent transmissions over commensurate network connections. It will be understood that FIG. 1 is shown as a simplistic example for clarity and that various configurations and arrangements of internal entities and data may be implemented in a given instance of streaming data processing system 100.

Streaming data processing system 100 may represent data processing that can be performed using a data repository, such as a streaming data warehouse (not explicitly shown in FIG. 1), which generally represents a database storage system, such as a relational database management system (RDBMS). As defined here, a "streaming data warehouse" refers to a type of database system that is configured to handle processing operations while a data stream is arriving. As used herein, "data stream" represents a continuous incoming flow of new data to the streaming data warehouse. A data stream may be comprised of individual "data blocks" that are associated with a respective "data source" that contributes to the data stream. Each data source may send updates to the streaming data warehouse in the form of data blocks, which may represent various amounts, or lengths, of data. A data block may be further divided into other data units, such as bits, bytes, datagrams, network packets, etc. The data blocks in the arriving data stream may arrive in regular or irregular intervals. It is noted that a streaming data warehouse may represent any of a variety of database types, including very large and complex databases, or databases that include components that are physically placed in different locations, also referred to as distributed databases. A streaming data warehouse may be associated, or linked, with a database interface specification (not shown in FIG. 1), or other specification, which may represent a collection of rules, conventions, documentation, and/or other forms of specifying or describing a particular logical database.

In FIG. 1, streaming data processing system 100 may be commissioned by a data stream owner (not shown), who may be a responsible entity (e.g., an owner) of input data stream 130 and/or output data stream 132. Although a data stream owner may desire to have certain data processing operations performed, the data stream owner may not desire to purchase, install, and operate a data repository (not explicitly shown in FIG. 1) for this purpose, and may instead, choose to engage data service provider 104 to perform such tasks. The data processing arrangement depicted in streaming data processing system 100 may be economically advantageous to both the data stream owner (not shown in FIG. 1) and data service provider 104. For example, data service provider 104 may be able to provide data processing services less expensively than the data stream owner, because data service provider 104 may have attained a greater economy of scale. Thus, in streaming data processing system 100, data service provider 104 may operate a data repository (not shown in FIG. 1) with sufficient processing capacity and related resources to handle desired processing operations.

In FIG. 1, streaming data processing system 100 includes verifier 112, which may represent an agent or agency that operates to serve the data stream owner (not shown) to validate that desired processing operations are performed correctly and accurately by data service provider 104. In certain embodiments, verifier 112 may itself be an internal organ of the data stream owner. For such purposes, verifier 112 may also be configured to access input data stream 130 and/or output data stream 132 with a given level of processing capacity. In order to attain the economic advantages mentioned above, verifier 112 may generally be assumed to have a lower level of processing capacity than data service provider 104. For example, verifier 112 may have single-pass access to input data stream 130 and/or output data stream 132, such that data blocks (not shown in FIG. 1) of input data stream 130 may be received en route to data service provider 104. Similarly, data blocks of output data stream 132 may be received from data service provider 104 by verifier 112. Such data blocks received by verifier 112 may be immediately processed by verifier 112, but are not generally retained beyond a limited buffering capacity. In this manner, verifier 112 may be configured to monitor and/or validate certain processing operations performed by data service provider 104, while maintaining a substantially smaller data processing capability than data service provider 104, which is correspondingly associated with lower capital expenditures and operational resources. Accordingly, verifier 112 may employ processing algorithms for validating data structures maintained by data service provider 104 within a constrained memory space, as will be discussed in detail herein.

Figure 2:
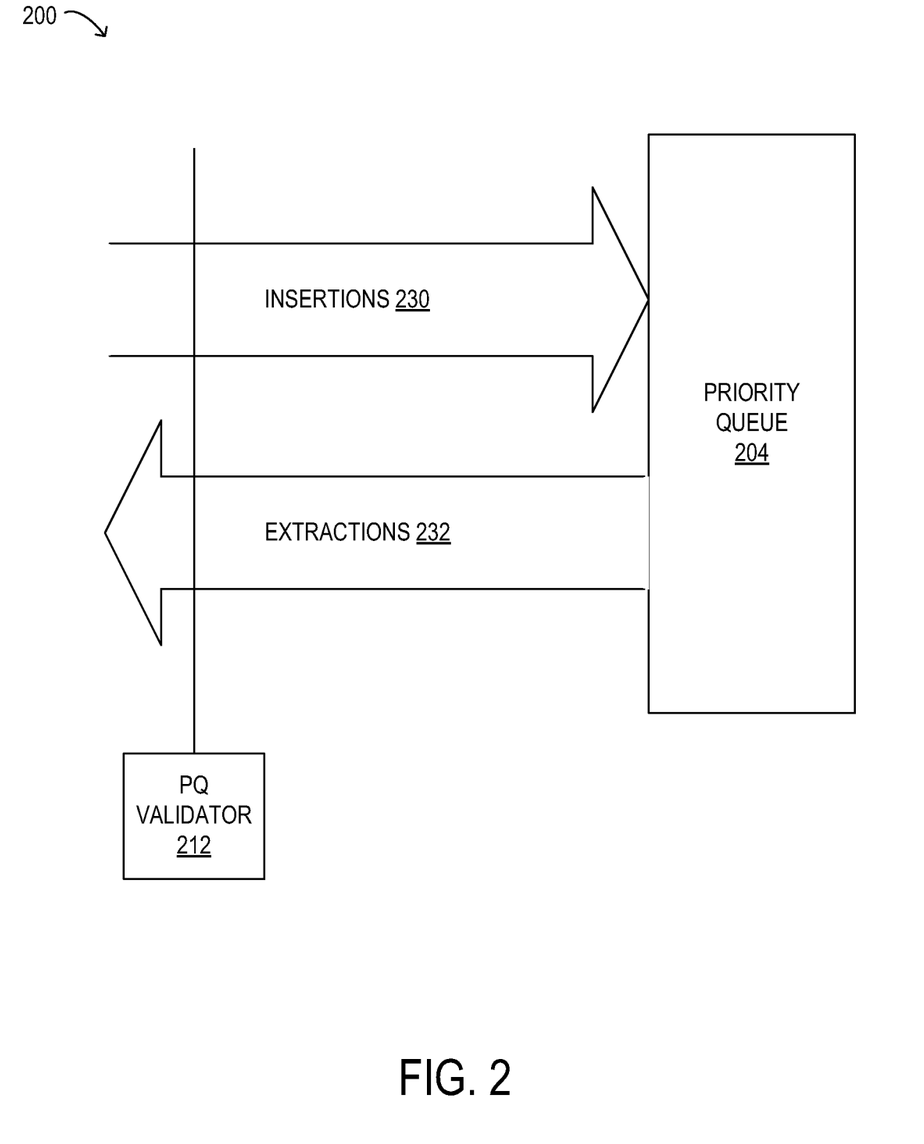
FIG. 2 is a block diagram of selected elements of a priority queue system.

Referring to FIG. 2, a block diagram of selected elements of priority queue system 200 is shown as an example implementation of similar elements as depicted in streaming data processing system 100 (see FIG. 1). Specifically, in priority queue system 200, priority queue 204 may represent an implementation of a priority queue operated by data service provider 104 on behalf of a data stream owner (not shown). Insertions 230 may represent "insertion operations" on priority queue 204, in an analogous manner to input data stream 130 (see FIG. 1), while extractions 232 may represent "extraction operations" from priority queue 204, in an analogous manner to output data stream 132 (see FIG. 1). In priority queue system 200, PQ validator 212 may be similarly configured as verifier 112 is configured in streaming data processing system 100 (see FIG. 1).

In FIG. 2, priority queue 204 may represent a queue-type data structure that is configured for storing and retrieving elements of data, in a similar manner as other types of stacks and queues. Specifically, priority queue 204 supports insertion operations (simply referred to as insertions 230) for adding elements and extraction operations (simply referred to as extractions 232) for removing elements. In certain embodiments, priority queue 204 may also support "peek operations", which are read-only operations that do not affect the contents of priority queue 204, that is, do not add or remove elements. Priority queue operations may be associated with one or more elements. An element in priority queue 204 may generally be represented in the form:

[(priority value),(data element)]

wherein the priority value is represented by u, and the data element may include one or more data fields, such as, a data value, a timestamp, a data record, a data array, a data identifier, a data pointer, etc. Since the priority value and the data element are in a fixed association for the purposes related to priority queue 204, the discussion herein shall explicitly refer to u as the priority value with respect to a priority queue operation. It will be understood that the priority value u is associated with a corresponding implicit data element in priority queue operations and in elements stored within priority queue 204. In the exemplary embodiments described and discussed herein, it will also be understood that the magnitude or value of u increases with decreasing priority; in other words, operations with lower values for u have a higher priority. In various embodiments of priority queue 204, other conventions and scales (not shown or further discussed herein) may be implemented for the priority value u.

In operation of priority queue 204, at an initial state, priority queue 204 may be empty and may initially accept one or more insertions 230, before an extraction 232 is output. During a normal operational state, priority queue 204 may accept insertions 230 and may provide extractions 232. Finally, during a terminal state, priority queue 204 may no longer accept insertions 230, but may output extractions 232 until priority queue 204 is again empty.

An insertion 230 may arrive at priority queue 204 in the form of a defined insertion operator (i.e., a function call) that includes (or specifies) the priority value u and the data element. An extraction 232 may be obtained from priority queue 204 using a defined extraction operator (i.e., a function call or a request) that requests priority queue 204 to output the highest priority element from the elements currently stored in priority queue 204. When priority queue 204 outputs the highest priority element currently stored in response to an extraction request, priority queue 204 may be considered as operating correctly.

Also shown in FIG. 2 is PQ validator 212, which may be configured to monitor and/or validate the operation of priority queue 204. According to the methods described herein, PQ validator 212 may be configured to validate priority queue 204 in an independent manner, that is, without resorting to a communication protocol with an external entity. It is noted that PQ validator 212 may also be configured for single-pass access to insertions 230 and extractions 232 for the purposes of validating the operation of priority queue 204. The single-pass access may result in an input data stream (not explicitly shown in FIG. 2) to PQ validator 212, comprising a combination of insertions 230 and extractions 232. The data stream received by PQ validator 212 may be the same or substantially the same as the data stream received by priority queue 204. As noted above with respect to verifier 112 (see FIG. 1), the single-pass access may be associated with a limited data storage and processing ability of PQ validator 212. Methods described herein enable PQ validator 212 to validate priority queue 204 while maintaining a substantially smaller computational footprint than data service provider 104 (see FIG. 1) hosting priority queue 204.

Figure 3:
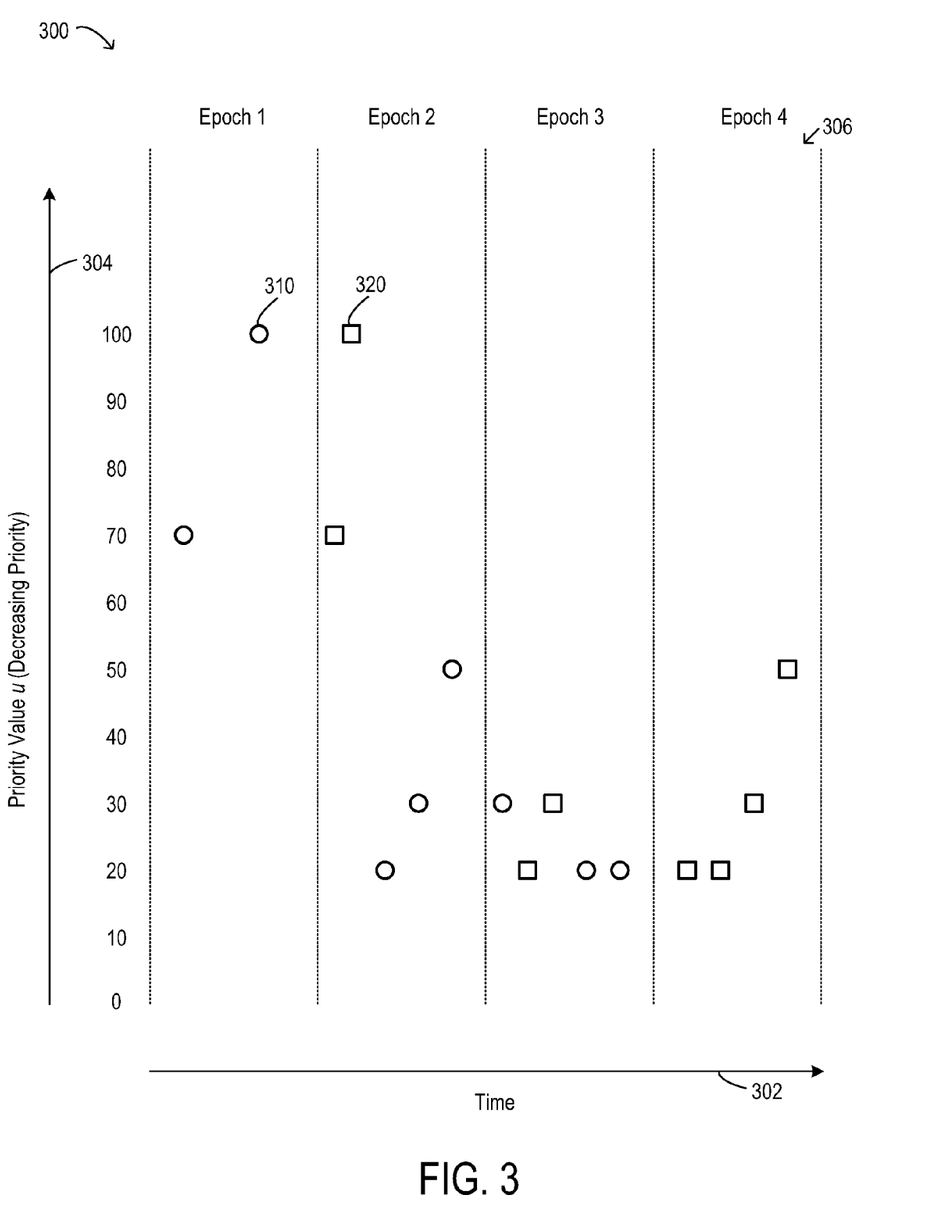
FIG. 3 is a diagram illustrating aspects of a priority queue validation method.

Turning now to FIG. 3, a diagram of selected elements of an embodiment of PQ implementation 300 is shown. PQ implementation 300, which represents an exemplary embodiment of priority queue system 200 (see FIG. 2), as shown in FIG. 3, may be implemented by data service provider 104 (see FIG. 1) in conjunction with PQ validator 212 (see FIG. 2). PQ implementation 300, features of which will now be described in further detail, is an illustrative example. It will be understood that, depending upon the implementation, PQ implementation 300 may generally represent larger and more complex versions of priority queue system 200 (see FIG. 2) in accordance with disclosed methods and operations.

In PQ implementation 300 of FIG. 3, an exemplary operational lifetime of priority queue 204 (see FIG. 2) is depicted in graphical form along time axis 302 and priority value axis 304. As noted above, priority value axis 304 represents values for u that increase with decreasing priority. It is noted that the scale and range of priority values u along priority value axis 304 represented in PQ implementation 300 are arbitrary and have been chosen for effective description, specifically, in the range from 0 to 100 with 0 representing the highest priority and 100 representing the lowest priority. In PQ implementation 300, time axis 302 is shown in relative terms without any numerical scaling. In PQ implementation 300, insertions 310 (shown as circles) and extractions 320 (shown as squares) are plotted against their respective processing times along time axis 302 and their respective priority values u along priority value axis 304. In PQ implementation 300, the operational lifetime of priority queue 204 is divided into epochs 306. It is noted that, as depicted in PQ implementation 300, epochs 306 may represent equally-sized periods of time during the operational lifetime of priority queue 204. In other embodiments (not shown in FIG. 3), epochs 306 may represent periods during which an equal number or a substantially equal number of operations are processed by priority queue 204. It is noted that in Epoch 1, the first of epochs 306, only insertions 310 are present, while in Epoch R, the last of epochs 306, only extractions 320 are present. It is further noted that, while four instances of epochs 306 are shown in PQ implementation 300, in other embodiments, various numbers of epochs 306 may be used to divide the operational lifetime of priority queue 204 (see also Equation 1 below).

The underlying priority values u depicted in PQ implementation 300 are represented in Table 1 below, as ordered according to epochs 306 (no specific indication of time axis 302) and divided into extractions 320 and insertions 310.

TABLE 1

Priority Values u in PQ implementation 300 (see FIG. 3)

|  | Epoch 1 | Epoch 2 | Epoch 3 | Epoch 4 |
| --- | --- | --- | --- | --- |
| Extractions (320) | [none] | 70 | 20 | 20 |
|  |  | 100 | 30 | 20 |
|  |  |  |  | 30 |
|  |  |  |  | 50 |
| Insertions (310) | 100 | 20 | 20 | [none] |
|  | 70 | 30 | 30 |  |
|  |  | 50 | 20 |  |

As will now be described in further detail, the representation of extractions 320 and insertions 310, as shown in Table 1, may be used in a method for validating the operation of priority queue 204 by PQ validator 212 (see FIG. 2). Specifically, Algorithm 1, exemplary elements of which are set forth in Table 2 may, be used for priority queue validation by PQ validator 212 in a single-pass, independent manner. It is noted that Algorithm 1 may be performed by PQ validator 212 in a variety of implementations and embodiments. For example, when N priority queue operations are to be received, PQ validator 212 may be configured to divide the N operations into R epochs that are substantially equally-sized. In one embodiment (not shown in FIG. 3), the R epochs may be equally-sized in a number of operations per epoch, for example, N/R operations per epoch R. In another embodiment, as depicted in FIG. 3, the epochs may be equally-sized with respect to a period of time. Thus, as the respective operations for each individual epoch k in the R epochs are received, PQ validator 212 may perform certain operations and buffer certain values. As will be described with respect to Algorithm 1, certain portions of epoch k may be buffered. In certain embodiments, Algorithm 1 may be performed on a current buffered instance of epoch k, which may be replaced by a next buffered instance of epoch k. For example, the values shown in Table 1 may represent buffered values u and epochs k (for R=4) that have been ordered and/or sorted in conjunction with operations performed in Algorithm 1.

TABLE 2

Algorithm 1 for Validating a Priority Queue

| Line | Algorithm 1 -- Operation |
|---|---|
| 01: | begin receiving priority queue operations comprising insertions and extractions for R epochs |
| 02: | initialize arrays X, Y, Z and function f[R] to zero for k in the range of {1...R} |
| 03: | for each epoch k in R begin |
| 04: | for each extraction in epoch k begin |
| 05: | assign the extraction to an earliest epoch L consistent with u and the values of f[k] |
| 06: | increment an element [L, u] of array Y |
| 07: | assign a value max(Y [L, u], Z [L, u]) to an element [L, u] of array Z |
| 08: | assign a value max(u, f[i]) to f[i] for each i in the range of {1...(k−1)} |
| 09: | end |
| 10: | for each insertion in epoch k begin |
| 11: | assign the insertion to an earliest epoch L consistent with u and the values of f[k] |
| 12: | increment an element [L, u] of array X when f[L] < u |
| 13: | decrement an element [L, u] of array Y when f[L] = u |
| 14: | end |
| 15: | end |
| 16: | when X ≠ Z or X ≠ Y validate the priority queue operations, else priority queue error |

In certain instances, a size of R may be selected for efficiency of processing such that:

$$R = N/R = \text{sqrt}(N) \qquad \text{Equation 1.}$$

Furthermore, arrays X, Y, Z, which are used in Algorithm 1 for tracking insertions 310 and validating extractions 320, may be stored in various forms, such as compressed, hashed, encrypted, etc. In one example, an array hashing function may be used to create a homomorphic fingerprint for arrays X, Y, Z. The array hashing function may be a linear function whose output is a linear function of an array input (i.e., array X, Y, or Z), such that an incremental (or decremental) value for the array hashing function can be calculated. One example of such an array hashing function that generates a homomorphic fingerprint is a polynomial hashing function described with respect to the Rabin-Karp string matching algorithm. As a result of the foregoing, it is noted that Algorithm 1 may be performed using a memory space that is proportional to sqrt (N).

In Algorithm 1, line 01 represents operations for receiving insertions 310 and extractions 320, as well as successively buffering each of a set of R epochs. In line 02, arrays X, Y, Z, which are functions of [L, u], along with function f[k], may be initialized to zero for all values. Lines 03-15 represent operations that are repeated for each epoch k. Lines 04-09 represent operations that are repeated for each extraction 320 in a given epoch k which lines 10-14 represent operations that are repeated for each insertion 310 in epoch k. Line 16 represents a validation operation. Subject to the assignment of f[k] in line 08, after each epoch k is processed, f[k] indicates a maximum priority for extractions that occur after the k-th epoch (i.e., no extraction occurring after epoch k has a priority value (u) greater that f[k]).

An example of Algorithm 1 using input values from Table 1 will now be described in detail for a hypothetical set of operations, having five priority values, divided or buffered into four epochs (R=4). In Table 1, the values for u are given by the set {20, 30, 50, 70, 100}; since R=4, the values for L and k are given by the set {1, 2, 3, 4}. In line 01, the values in Table 1 may begin arriving, starting with Epoch 1 (k=1) and continue for successive epochs, which may be buffered and respectively separated into a set of extractions 320 followed by a set of insertions 310 (see also FIG. 5 for a discussion of intra-epoch operations). Then, in line 02, arrays X, Y, Z may each be initialized to a state given by Table 3.

TABLE 3

Initialized Values for Arrays X, Y, Z
in PQ implementation 300 (see FIG. 3)

| L | u = 20 | u = 30 | u = 50 | u = 70 | u = 100 |
|---|---|---|---|---|---|
| 1 | 0 | 0 | 0 | 0 | 0 |
| 2 | 0 | 0 | 0 | 0 | 0 |
| 3 | 0 | 0 | 0 | 0 | 0 |
| 4 | 0 | 0 | 0 | 0 | 0 |

An initialized state for f[k] may be given by:

$$f[k] = [0,0,0,0] \qquad \text{Equation 2.}$$

In line 03, processing of Epoch 1 (k=1) of Table 1 may begin with the selection of extractions 320 in Epoch 1 in line 04. Since no extractions 320 are present in Epoch 1, which represents an initial state of priority queue 204 (see FIG. 2), lines 04-09 are skipped. Then, processing of Epoch 1 of Table 1 continues with the selection of insertions 310 in Epoch 1 in line 10. The first insertion corresponds to a value u=100. In line 11, the first insertion may be assigned to an earliest epoch L consistent with u and the values of f[k], which may be given by:

$$L = \min[k: f[k] \le u] \qquad \text{Equation 3.}$$

In Equation 3, L is assigned the minimum value of k for all f[k]≤u. Since f[k]=[0, 0, 0, 0], as given by Equation 2, L=1 for the first insertion in Epoch 1. In line 12, an element [1, 100] is incremented in array X since f[1]=0 and u=100, so f[1]<u. Accordingly, line 13 does not result in a change in array Y for Epoch 1, since f[1]≠u. Lines 10-14 may be repeated for the second insertion in Epoch 1, u=70, resulting in an increment of the element [1, 70] for array X. At the end of processing for Epoch 1, arrays Y and Z remain at zero, as in Table 3, while array X is given by Table 4. It is further noted that at the end of processing for Epoch 1, f[k] remains unchanged and equals [0, 0, 0, 0], as given by Equation 2.

TABLE 4

Values for Array X After Epoch 1

| L | u = 20 | u = 30 | u = 50 | u = 70 | u = 100 |
|---|--------|--------|--------|--------|---------|
| 1 | 0 | 0 | 0 | 1 | 1 |
| 2 | 0 | 0 | 0 | 0 | 0 |
| 3 | 0 | 0 | 0 | 0 | 0 |
| 4 | 0 | 0 | 0 | 0 | 0 |

Processing of Epoch 2 (k=2) may continue in Algorithm 1 by returning to line 03. In line 04, extractions 320 in Epoch 2 begin with a first extraction for which u=70. In line 05, L may be assigned in substantially the same manner as in line 11, that is, according to Equation 3, which yields L=1. In line 06, element [1, 70] in array Y is incremented. In line 07, element [1, 70] in array Z is incremented. In line 08, i is given by the set {1} and f[k] is updated to f[k]=[70, 0, 0, 0]. Processing of Epoch 2 may continue by returning to line 04 for the second extraction for which u=100. Then, in line 06, element [1, 100] in array Y is incremented. In line 07, element [1, 100] in array Z is incremented. In line 08, i is given by the set {1} and f[k] is updated to:

$$f[k]=[100,0,0,0] \quad \text{Equation 4.}$$

Then, processing of Epoch 2 continues with the selection of insertions 310 in Epoch 2 in line 10. The first insertion corresponds to a value u=20. In line 11, L is assigned the value L=2, as given by Equation 3, since at this point f[k]=[100, 0, 0, 0], as given by Equation 4. Since f[2]<u for u=20, an element [2, 20] is incremented in array X. Accordingly, line 13 does not result in a change in array Y for Epoch 2, since f[2]≠u. Lines 10-14 may be repeated for the second insertion and third insertion in Epoch 2, for u=30 and u=50, resulting in an increment of the elements [2, 30] and [2, 50] for array X. At the end of processing for Epoch 2, arrays Y and Z remain as in Table 4, while array X is given by Table 5. It is further noted that at the end of processing for Epoch 2, f[k]=[100, 0, 0, 0], as given by Equation 4.

TABLE 5

Values for Array X After Epoch 2

| L | u = 20 | u = 30 | u = 50 | u = 70 | u = 100 |
|---|--------|--------|--------|--------|---------|
| 1 | 0 | 0 | 0 | 1 | 1 |
| 2 | 1 | 1 | 1 | 0 | 0 |
| 3 | 0 | 0 | 0 | 0 | 0 |
| 4 | 0 | 0 | 0 | 0 | 0 |

Processing of Epoch 3 (k=3) may continue in Algorithm 1 by returning to line 03. In line 04, extractions 320 in Epoch 3 begin with a first extraction for which u=20. In line 05, L may be assigned according to Equation 3, which yields L=2. In line 06, element [2, 20] in array Y is incremented. In line 07, element [2, 20] in array Z is incremented. In line 08, i is given by the set {1, 2} and f[k] is updated to f[k]=[100, 20, 0, 0]. Processing of Epoch 3 may continue by returning to line 04 for the second extraction for which u=30. Then, in line 06, element [2, 30] in array Y is incremented. In line 07, element [2, 30] in array Z is incremented. In line 08, i is given by the set {1, 2} and f[k] is updated to:

$$f[k]=[100,30,0,0] \quad \text{Equation 5.}$$

Thus, at line 09 for Epoch 3, arrays Y and Z are given by Table 6.

TABLE 6

Values for Arrays Y, Z After Processing of Extractions in Epoch 3 (line 09)

| L | u = 20 | u = 30 | u = 50 | u = 70 | u = 100 |
|---|--------|--------|--------|--------|---------|
| 1 | 0 | 0 | 0 | 1 | 1 |
| 2 | 1 | 1 | 0 | 0 | 0 |
| 3 | 0 | 0 | 0 | 0 | 0 |
| 4 | 0 | 0 | 0 | 0 | 0 |

Then, processing of Epoch 3 continues with the selection of insertions 310 for Epoch 3 in line 10. The first insertion corresponds to a value u=20. In line 11, L is assigned the value L=3, as given by Equation 3, since at this point f[k]=[100, 30, 0, 0], as given by Equation 5. Since f[3]<u for u=20, an element [3, 20] is incremented in array X. At this point, line 13 does not result in a change in array Y for u=20, since f[3]≠u. Line 10 in Epoch 3 is then repeated for the second insertion in Epoch 3, which corresponds to a value u=30. In line 11, L is assigned the value L=2, as given by Equation 3, since f[k]= [100, 30, 0, 0]. Since f[2]=u for u=30, no element is incremented in array X in line 12, but rather, element [2, 30] is decremented in array Y, since f[2]=u for u=30. Lines 10-14 may be repeated for the third insertion in Epoch 3, u=20, resulting in a second increment of the element [3, 20] for array X. At the end of processing for Epoch 3, array Y is given by Table 7, array Z remains as in Table 6, while array X is given by Table 8. It is further noted that f[k]=[100, 30, 0, 0], as given by Equation 5.

TABLE 7

Values for Array Y After Epoch 3

| L | u = 20 | u = 30 | u = 50 | u = 70 | u = 100 |
|---|--------|--------|--------|--------|---------|
| 1 | 0 | 0 | 0 | 1 | 1 |
| 2 | 1 | 0 | 0 | 0 | 0 |
| 3 | 0 | 0 | 0 | 0 | 0 |
| 4 | 0 | 0 | 0 | 0 | 0 |

TABLE 8

Values for Array X After Epoch 3 (and Final Values for Arrays X, Y, Z After Epoch 4)

| L | u = 20 | u = 30 | u = 50 | u = 70 | u = 100 |
|---|--------|--------|--------|--------|---------|
| 1 | 0 | 0 | 0 | 1 | 1 |
| 2 | 1 | 1 | 1 | 0 | 0 |
| 3 | 2 | 0 | 0 | 0 | 0 |
| 4 | 0 | 0 | 0 | 0 | 0 |

Processing of Epoch 4 (k=4) may continue in Algorithm 1 by returning to line 03. In line 04, extractions 320 in Epoch 4 begin with a first extraction for which u=20. In line 05, L may be assigned according to Equation 3, which yields L=3. In line 06, element [3, 20] in array Y is incremented. In line 07, element [3, 20] in array Z is incremented. In line 08, i is given by the set {1, 2, 3} and f[k] is updated to f[k]=[100, 30, 20, 0]. Processing of Epoch 4 may continue by returning to line 04 for the second extraction for which u=20. Then, in line 06, element [3, 20] in array Y is incremented. In line 07, element [3, 20] in array Z is incremented. In line 08, f[k] does not change. Processing of Epoch 4 may continue by returning to line 04 for the third extraction for which u=30. In line 05, L may be assigned according to Equation 3, which yields L=2. In line 06, element [2, 30] in array Y is incremented. In line 07, since element [2,30] in array Z is equal to the corresponding element in array Y, no change occurs. In line 08, i is given by the set {1, 2, 3} and f[k] is updated to f[k]=[100, 30, 30, 0]. Then, processing of Epoch 4 may continue by returning to line 04 for the fourth extraction for which u=50. In line 05, L may be assigned according to Equation 3, which yields L=2. In line 06, element [2, 50] in array Y is incremented. In line 07, element [2, 50] in array Z is incremented. In line 08, i is given by the set {1, 2, 3} and f[k] is updated to $$f[k]=[100,50,50,0]$$ Equation 6.

Equation 6 represents a final value for f[k] at line 16, while arrays X=Y=Z, corresponding to the values in Table 8, at the end of Algorithm 1. The processing of priority queue 204 (see FIG. 2) according to PQ implementation 300 may thus be validated by Algorithm 1.

Figure 4:
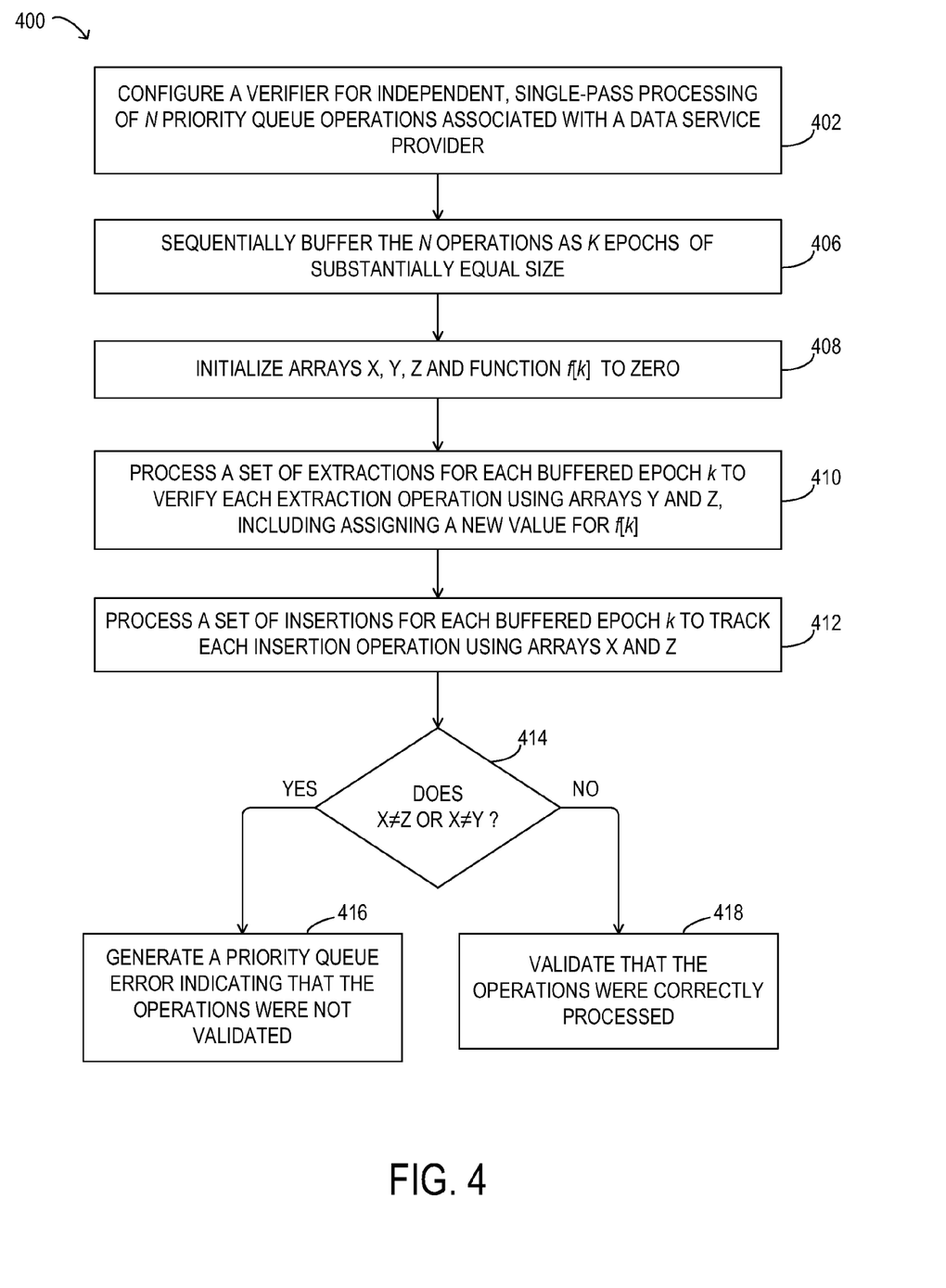
FIG. 4 is a block diagram of selected elements of an embodiment of a priority queue validation method.

Turning now to FIG. 4, selected elements of an embodiment of method 400 for validating a priority queue are illustrated in flow chart form. Method 400 may represent an algorithm used in the context of streaming data processing system 100 and/or priority queue system 200, or elements included therein (see also FIGS. 1-3). Method 400 may also involve functionality provided by PQ validation 714 executing on computing device 700 (see FIG. 7). It is noted that certain operations described in method 400 may be optional or may be rearranged in different embodiments.

In the depicted embodiment, method 400 includes configuring (operation 402) a verifier for independent, single-pass processing of N priority queue operations associated with a data service provider. The N priority queue operations may include insertions 230 to priority queue 204 and extractions 232 from priority queue 204 (see FIG. 2). The N operations may be buffered (operation 406) as R epochs of substantially equal size. The R epochs may be equally-sized with respect to a number of operations or to a period of time. Arrays X, Y, Z and function f[k] may be initialized (operation 408) to zero. A set of extractions for each buffered epoch k may be processed (operation 410) to verify each extraction operation using arrays Y and Z, including assigning a new value for f[k] (see also Algorithm 1, line 08). A set of insertions for each buffered epoch k may then be processed (operation 412) to track each insertion operation using arrays X and Z. Then, a decision may be made (operation 414) whether X≠Z or X≠Y. When the result of operation 414 is YES, a priority queue error may be generated (operation 416) indicating that the operations were not validated. When the result of operation 414 is NO, method 400 may validate (operation 418) that the operations were correctly processed.

Figure 5:
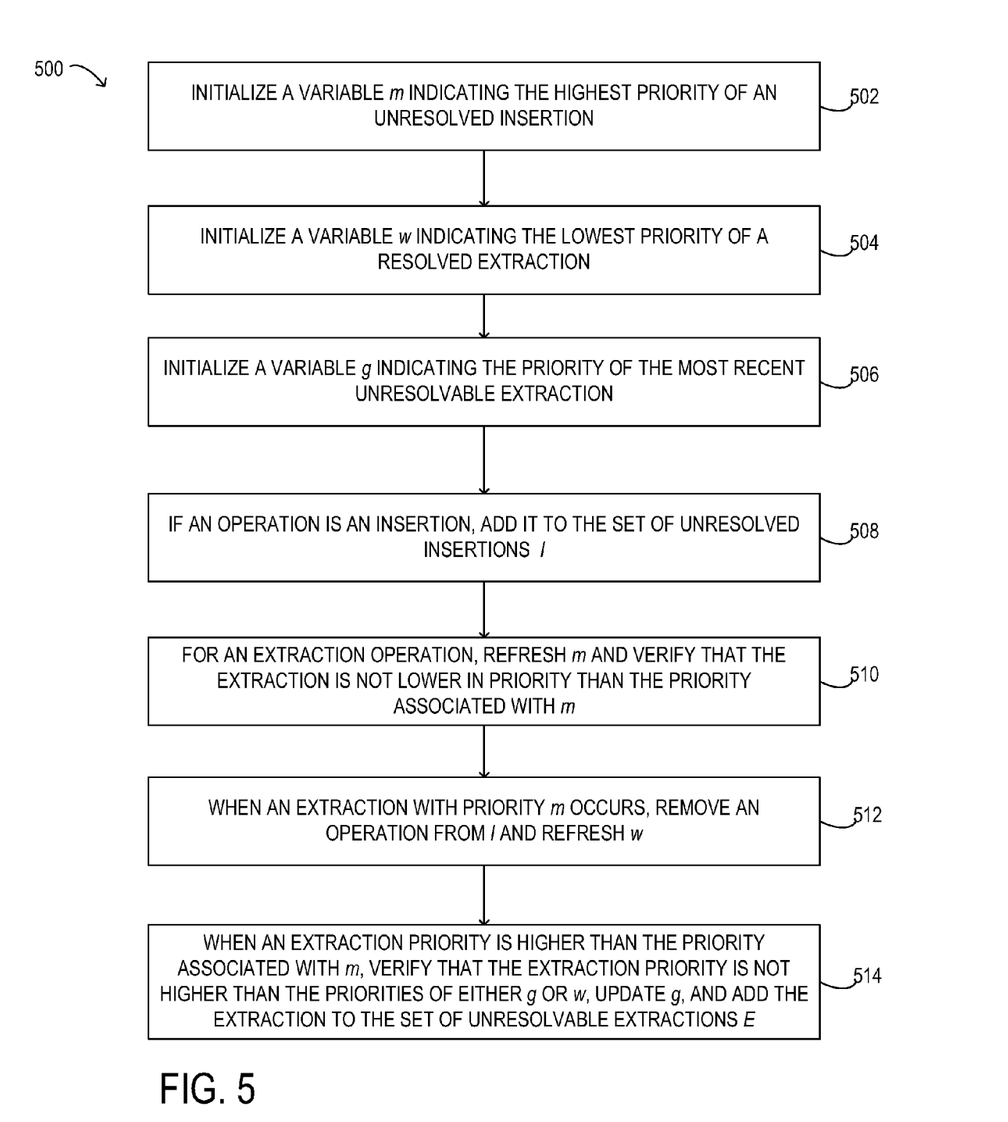
FIG. 5 is a block diagram of selected elements of an embodiment of a priority queue validation method.

Turning now to FIG. 5, selected elements of an embodiment of method 500 for performing selected operations for validating a priority queue are illustrated in flow chart form. Method 500 may represent an algorithm used in the context of streaming data processing system 100 and/or priority queue system 200, or elements included therein (see also FIGS. 1-3). Method 500 may also involve functionality provided by PQ validation 714 executing on computing device 700 (see FIG. 7). It is noted that certain operations described in method 500 may be optional or may be rearranged in different embodiments. In certain embodiments, method 500 may represent operations performed prior to operation 410 as described above with respect to FIG. 4 within the context of Algorithm 1 (see Table 2, FIG. 3). Method 500 may, for example, represent an algorithm intended to verify that a given subset of priority queue operations is locally consistent.

A subset of priority queue operations is said to have local consistency when two conditions are met. First, local consistency requires that the operations occurring between a higher priority insertion and a later-occurring lower priority extraction must include more extractions having the higher priority than insertions having the higher priority. Second, local consistency requires that the operations between a lower priority extraction and a later-occurring higher priority extraction must include more insertions having the higher priority than extractions having the higher priority.

The embodiment of method 500 depicted in FIG. 5 verifies local consistency of a subset of priority queue operations. As was true with respect to FIG. 4 discussed previously, higher priorities operations are indicated by lower operation priority values. Three variables m, w, and g are declared and initialized. In block 502, the variable m is declared where m is maintained to indicate the highest priority (lowest u) of an unresolved insertion operation, where unresolved, in this context, refers to an insertion occurring in the subset of operations that has not been extracted within the subset. In block 504, the variable w is declared and initialized to 0. The variable w is maintained to indicate the lowest priority (highest v) of an extraction that is resolved within the current subset, i.e., an extraction that occurs in the subset and resolves an insertion that occurs within the subset. In block 506, the variable g is maintained to indicate the priority of the most recently occurring unresolvable extraction, i.e., an extraction having a higher priority than the priority of the highest priority unresolved insertion. In a properly ordered set of priority queue operations, an unresolvable extraction corresponds to an insertion that occurred in a previous subset of the priority queue operations.

After the initialization blocks, method 500 as shown includes adding (block 508) a priority queue operation in the subset of operations to a set of unresolved insertions I if the operation is, in fact, an insertion. If the operation is an extraction, I is unaffected, but the value of the variable m is updated in block 510 to indicate the highest priority of the unresolved insertions, i.e., the highest priority insertion in I. Block 510 as shown in FIG. 5 further includes verifying that a priority of the current extraction is not lower than the priority indicated by the variable m (i.e., reject the extraction if v>m). An extraction priority lower than the priority indicated by the variable m would indicate a violation of priority queue rules in which extractions must extract the highest priority insertion that remains unresolved.

The depicted embodiment of method 500 further includes removing (block 512) an insertion operation from the set of unresolved insertions I when the priority of an extraction is equal to the priority associated with the current value of m, i.e., the extraction priority equals the priority of the unresolved insertion with the highest priority. Block 512 as shown further includes updating the variable w to indicate the lowest priority of a resolved extraction. The embodiment of method 500 shown in FIG. 5 further includes verifying (block 514) that the priority of an unresolvable extraction, i.e., an extraction having a priority that is higher than the priority associated with the value of m, is not higher than either the priority associated with the value of g or the priority associated with the value of w. Qualitatively, block 514 identifies an unresolved extraction that is higher in priority than either the priority of the most recent unresolvable extraction or the priority of the lowest priority resolved extraction, both of which would constitute a local consistency violation. If the priority of an unresolvable extraction is not higher than the priority associated with g or w, the extraction is included in the set of unresolvable extractions E. In this manner, method 500 verifies the local consistency of any subset of operations and identifies the set of insertions I that occurred in the subset, but were not resolved in the subset and the set of extractions E that occurred in the subset, but did not correspond to insertions that occurred in the subset.

Figure 6:
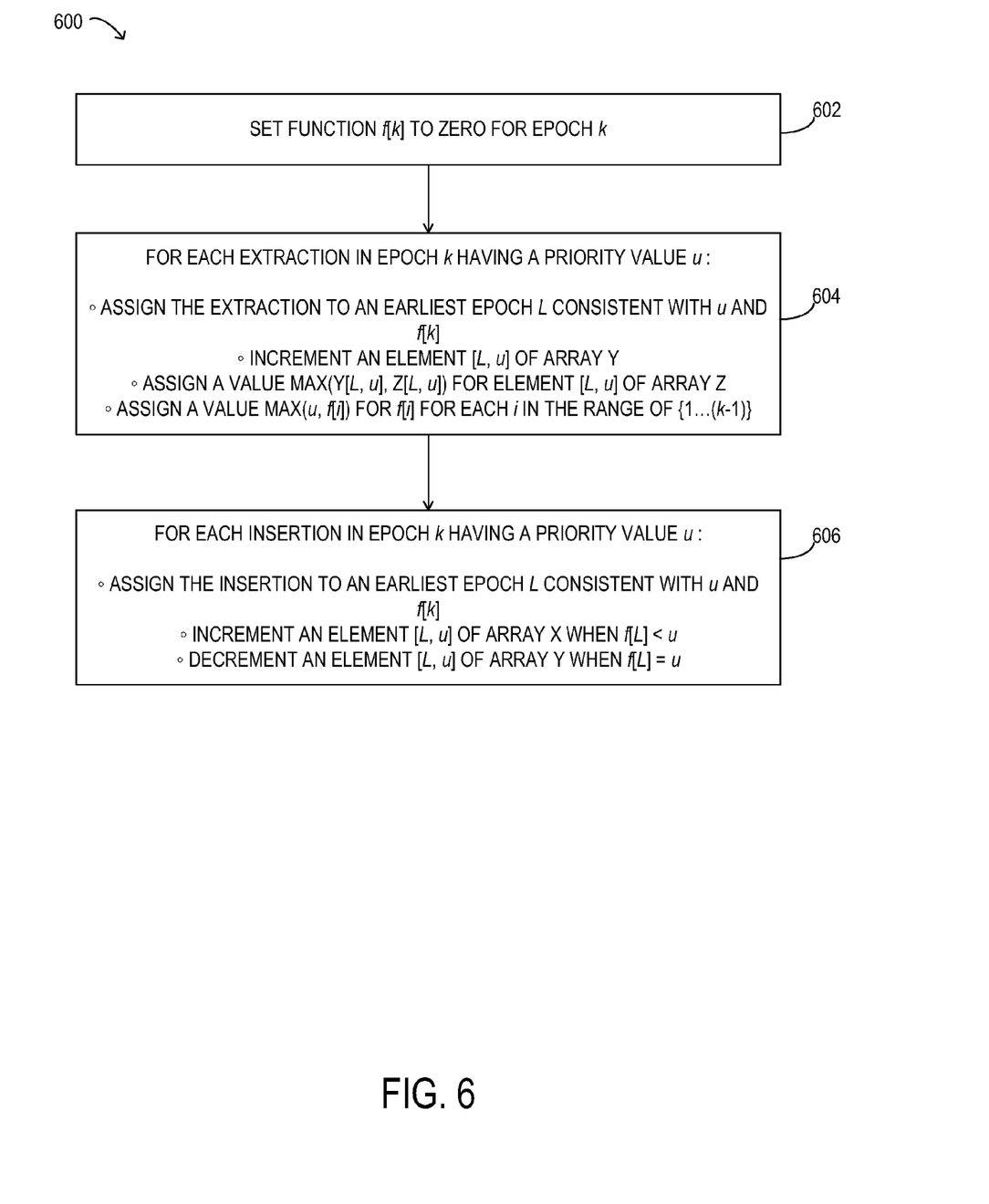
FIG. 6 is a block diagram of selected elements of an embodiment of a priority queue validation method.

Turning now to FIG. 6, selected elements of an embodiment of method 600 performing selected operations for validating a priority queue is illustrated in flow chart form. Method 600 may represent an algorithm used in the context of streaming data processing system 100 and/or priority queue system 200, or elements included therein (see also FIGS. 1-3). Method 600 may also involve functionality provided by PQ validation 714 executing on computing device 700 (see FIG. 7). It is noted that certain operations described in method 600 may be optional or may be rearranged in different embodiments. In certain embodiments, method 600 may represent an example of operations performed during operations 408, 410, 412 as described above with respect to method 400 in FIG. 4 within the context of Algorithm 1 (see Table 2, FIG. 3).

Figure 7:
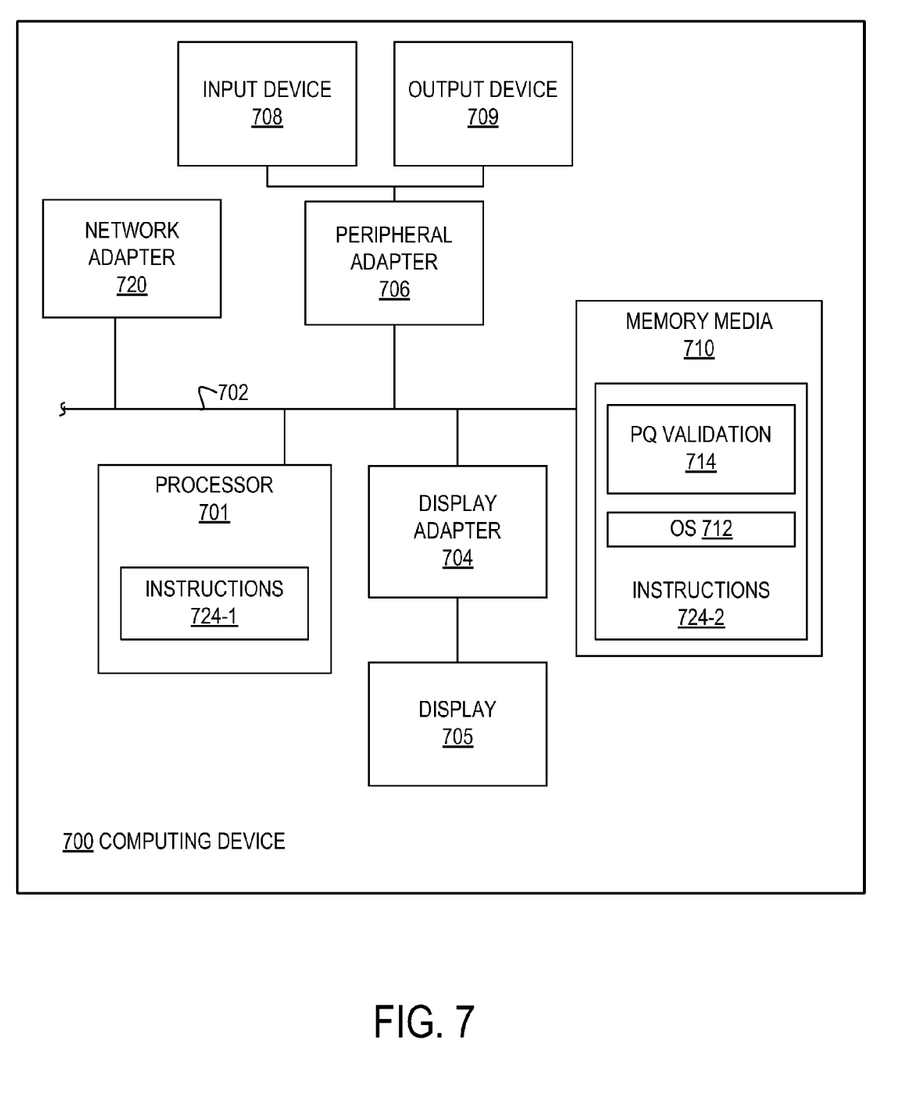
FIG. 7 is a block diagram of selected elements of an embodiment of a computing device suitable performing disclosed priority queue validation methods.

Method 600 may begin by setting (operation 602) function f[k] to zero. Operation 602 may result in a value for f[k] corresponding to Equation 2. Then, in method 600, the following operations may be performed (operation 604) for each extraction in epoch k having a priority value u:
  assign the extraction to an earliest epoch L consistent with u and f[k] (i.e., L indicates the smallest value of k where f[k]≤u)
  increment an element [L, u] of array Y
  assign a value max(Y [L, u], Z [L, u]) for element [L, u] of array Z
  assign a value max(u, f[i]) for f[i] for each i in the range of {1 ... (k−1)}
The following operations may then be performed (operation 606) for each insertion in epoch k having a priority value u:
  assign the extraction to an earliest epoch L consistent with u and f[k]
  increment an element [L, u] of array X when f[L]<u
  decrement an element [L, u] of array Y when f[L]=u Referring now to FIG. 7, a block diagram illustrating selected elements of an embodiment of a computing device 700 for performing a proof protocol according to the present disclosure is shown. In various embodiments, computing device 700 may represent an implementation of verifier 112. In the embodiment depicted in FIG. 7, device 700 includes processor 701 coupled via shared bus 702 to storage media collectively identified as memory media 710. Device 700 may be configured to perform any of the methods disclosed herein Device 700, as depicted in FIG. 7, further includes network adapter 720 that interfaces device 700 to a network (not shown in FIG. 7). In embodiments suitable for use in database systems, device 700, as depicted in FIG. 7, may include peripheral adapter 706, which provides connectivity for the use of input device 708 and output device 709. Input device 708 may represent a device for user input, such as a keyboard or a mouse, or even a video camera. Output device 709 may represent a device for providing signals or indications to a user, such as loudspeakers for generating audio signals.

Device 700 is shown in FIG. 7 including display adapter 704 and further includes a display device or, more simply, a display 705. Display adapter 704 may interface shared bus 702, or another bus, with an output port for one or more displays, such as display 705. Display 705 may be implemented as a liquid crystal display screen, a computer monitor, a television or the like. Display 705 may comply with a display standard for the corresponding type of display. Standards for computer monitors include analog standards such as video graphics array (VGA), extended graphics array (XGA), etc., or digital standards such as digital visual interface (DVI), high definition multimedia interface (HDMI), among others. A television display may comply with standards such as NTSC (National Television System Committee), PAL (Phase Alternating Line), or another suitable standard. Display 705 may include an output device 709, such as one or more integrated speakers to play audio content, or may include an input device 708, such as a microphone or video camera.

Memory media 710 encompasses persistent and volatile media, fixed and removable media, and magnetic and semiconductor media. Memory media 710 is operable to store instructions, data, or both. Memory media 710 as shown includes sets or sequences of instructions 724-2, namely, an operating system 712 and PQ validation 714. Operating system 712 may be a UNIX or UNIX-like operating system, a Windows® family operating system, or another suitable operating system. Instructions 724 may also reside, completely or at least partially, within processor 701 during execution thereof. It is further noted that processor 701 may be configured to receive instructions 724-1 from instructions 724-2 via shared bus 702. In some embodiments, memory media 710 is configured to store and provide executable instructions for executing a proof protocol as mentioned previously. For example, PQ validation 714 may be configured to execute PQ implementation 300, method 400, method 500 and/or method 600. In certain embodiments, computing device 700 may represent an implementation of verifier 112 and/or PQ validator 212 (see FIGS. 1, 2). In various embodiments, network adapter 720 may be used to access insertions 230 and/or extractions 232 (see FIG. 2).

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for validating a priority queue, comprising:
  assigning a plurality of priority queue operations comprising insertions and extractions into a plurality of epochs, wherein each of the insertions and each of the extractions is associated with a corresponding priority;
  maintaining a set of variables, including at least two variables for each of the plurality of epochs, to record information indicative of insertions and extractions assigned to corresponding epochs; and
  validating correct operation of the priority queue based on the set of variables,
  wherein the plurality of priority queue operations includes N operations and wherein the assigning of the plurality of priority queue operations results in R epochs wherein R is proportional to a square root of N.

2. The method of claim 1, wherein the set of variables include an array X, an array Y, and an array Z, and wherein the method includes initializing the array X, the array Y, and the array Z to zero.

3. The method of claim 2, wherein validating correct operation of the priority includes verifying equality of the array X, the array Y, and the array Z.

4. The method of claim 1, wherein assigning the plurality of priority queue operations includes:
  buffering consecutive operations; and
  canceling operation pairs, wherein an operation pair includes an insertion of a given priority and a subsequently occurring extraction of the given priority within the buffer.

5. The method of claim 1, wherein the assigning of the plurality of priority queue operations includes processing each of the plurality of epochs sequentially and maintaining an array indicative of a maximum priority of extractions assigned to a current epoch and to each previously processed epoch.

6. The method of claim 1, wherein hashing function representations of the set of variables are maintained and wherein a memory space required to process the plurality of priority queue operations is proportional to a number of epochs in the plurality of epochs.

7. The method of claim 6, wherein the hashing function is a linear function with respect to an input on which it operates.

8. A system for validating a priority queue, the system comprising:
- a processor; and
- memory storing instructions which when executed cause the processor to perform operations comprising:
- assigning a plurality of priority queue operations comprising insertions and extractions into a plurality of epochs, wherein each of the insertions and each of the extractions is associated with a corresponding priority;
- maintaining a set of variables, including at least two variables for each of the plurality of epochs, to record information indicative of insertions and extractions assigned to corresponding epochs; and
- validating correct operation of the priority queue based on the set of variables,
- wherein the plurality of priority queue operations includes N operations and wherein the assigning of the plurality of priority queue operations results in R epochs wherein R is proportional to a square root of N.

9. The computer of claim 8, wherein the set of variables includes an array X, an array Y, and an array Z, and wherein the operations include initializing the array X, the array Y, and the array Z to zero.

10. The computer of claim 9, wherein the operations further comprise verifying equality of the array X, the array Y, and the array Z.

11. The computer of claim 8, wherein the operations further comprise:
- buffering consecutive operations; and
- canceling operation pairs, wherein an operation pair includes an insertion of a given priority and a subsequently occurring extraction of the given priority within the buffer.

12. The computer of claim 8, wherein the operations further comprise processing each of the plurality of epochs sequentially and maintaining an array indicative of a maximum priority of extractions assigned to a current epoch and to each previously processed epoch.

13. The computer of claim 8, wherein the operations include maintaining hashing function representations of the set of variables.

14. A memory storing instructions, which when executed by a processor, cause the processor to perform operations comprising:
- assigning a plurality of priority queue operations comprising insertions and extractions into a plurality of epochs, wherein each of the insertions and each of the extractions is associated with a corresponding priority;
- maintaining a set of variables, including at least two variables for each of the plurality of epochs, to record information indicative of insertions and extractions assigned to corresponding epochs; and
- validating correct operation of the priority queue based on the set of variables,
- wherein the plurality of priority queue operations includes N operations and wherein the assigning of the plurality of priority queue operations results in R epochs wherein R is proportional to a square root of N.

15. The memory of claim 14, wherein the set of variables include an array X, an array Y, and an array Z, and wherein the operations include initializing the array X, the array Y, and the array Z to zero.

16. The memory of claim 15, wherein the operations further comprise verifying equality of the array X, the array Y, and the array Z.

17. The memory of claim 14, wherein the operations further comprise:
- buffering consecutive operations; and
- canceling operation pairs, wherein an operation pair includes an insertion of a given priority and a subsequently occurring extraction of the given priority within the buffer.

18. The memory of claim 14, wherein the operations further comprise processing each of the plurality of epochs sequentially and maintaining an array indicative of a maximum priority of extractions assigned to a current epoch and to each previously processed epoch.

* * * * *